United States Patent
Hwang et al.

(10) Patent No.: US 9,307,479 B2
(45) Date of Patent: Apr. 5, 2016

(54) DEDICATED BARRING AND ESCAPE COMMAND

(71) Applicant: Nokia Corporation, Espoo (FI)

(72) Inventors: Woonhee Hwang, Espoo (FI);
Jussi-Pekka Koskinen, Oulu (FI);
Jarkko T. Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 69 days.

(21) Appl. No.: 13/787,058

(22) Filed: Mar. 6, 2013

(65) Prior Publication Data
US 2014/0099969 A1 Apr. 10, 2014

Related U.S. Application Data

(60) Provisional application No. 61/608,356, filed on Mar. 8, 2012.

(51) Int. Cl.
*H04W 72/00* (2009.01)
*H04W 48/06* (2009.01)
(Continued)

(52) U.S. Cl.
CPC .............. *H04W 48/06* (2013.01); *H04W 48/18* (2013.01); *H04W 48/20* (2013.01); *H04W 76/027* (2013.01)

(58) Field of Classification Search
CPC ...... H04W 48/06; H04W 36/22; H04W 36/38
USPC ................. 455/453, 464, 450, 432, 433, 434; 370/328, 329, 330, 331
See application file for complete search history.

(56) References Cited

U.S. PATENT DOCUMENTS 8,731,477 B2 * 5/2014 Ekici .......................... 455/67.11
2010/0290389 A1 11/2010 Hou et al.
(Continued)

FOREIGN PATENT DOCUMENTS

EP           2306775 A2    4/2011
WO    WO-2009057960 A2    5/2009
(Continued)

OTHER PUBLICATIONS

International Search Report and Written Opinion received in corresponding Patent Cooperation Treaty Application No. PCT/FI2013/050212 dated Jun. 6, 2013. 11 pages.
(Continued)

*Primary Examiner* — Amancio Gonzalez
(74) *Attorney, Agent, or Firm* — Mintz Levin Cohn Ferris Glovsky and Popeo, P.C.

(57) ABSTRACT

In accordance with an example embodiment of the present invention, a method includes receiving a connection request in uplink signaling from a user equipment, the user equipment being located in a cell; making a determination whether the user equipment can be connected and, if it is determined that the user equipment cannot be connected, informing the user equipment by downlink signaling, as a response to the connection request, that the user equipment cannot be connected. The downlink signaling includes information that indicates that the user equipment should de-prioritize a current carrier frequency or current radio access technology, and can further include a timer value to indicate a period of time for which the current carrier frequency or current radio access technology is to be de-prioritized. The method can be executed by an evolved NodeB (eNB) of an evolved universal terrestrial radio access network (E-UTRAN).

16 Claims, 5 Drawing Sheets

(51) Int. Cl.
*H04W 48/20* (2009.01)
*H04W 48/18* (2009.01)
*H04W 76/02* (2009.01)

(56) References Cited

U.S. PATENT DOCUMENTS

| | | |
|---|---|---|
| 2011/0199905 A1 | 8/2011 | Pinheiro et al. |
| 2012/0020231 A1 | 1/2012 | Chen et al. |
| 2014/0198640 A1 | 7/2014 | Suzuki et al. |
| 2014/0329529 A1* | 11/2014 | Jung et al. ............. 455/436 |

FOREIGN PATENT DOCUMENTS

| | | | | |
|---|---|---|---|---|
| WO | 2012021879 A2 | 2/2012 | | |
| WO | WO 2012/111993 | * | 8/2012 | ............ H04W 76/02 |
| WO | WO-2014024123 A1 | 2/2014 | | |

OTHER PUBLICATIONS

3GPP TS 36.300 V11.0.0 (Dec. 2011) Technical Specification 3rd Generation Partnership Project; Technical Specification Group Radio Access Network; Evolved Universal Terrestrial Radio Access (E-UTRA) and Evolved Universal Terrestrial Radio Access Network (EUTRAN);Overall description; Stage 2 (Release 11), Dec. 22, 2011.

3GPP TS 36.331 V10.4.0 (Dec. 2011) Technical Specification 3rd Generation Partnership Project; Technical Specification Group Radio Access Network; Evolved Universal Terrestrial Radio Access (E-UTRA); Radio Resource Control (RRC); Protocol specification (Release 10), such as Section 5, Procedures, and more specifically Sections 5.3, Connection Control; 5.3.3, RRC connection establishment; 5.3.5, RRC connection reconfiguration, 5.3.7, RRC connection re-establishment, 5.3.8, RRC connection release and 5.4, Inter-RAT mobility. pp. 23-73 (Section 5.1 through Section 5.4), Dec. 22, 2011.

3GPP TSG CT WG1 Meeting #76, C1-120546, "LS on RR failures and network reselection, Release: Rel-11, Work Item: SAES2", Xiamen (P.R. China), 6-10. Feb. 2012.

3GPP TSG CT WG1 Meeting #76, C1-120103, "Allow UE to find new RAT on Network errors", Xiamen (P.R. China), 6-10. Feb. 2012, Change Request 24.301 CR 1317.

3GPP TSG CT WG1 Meeting #76, C1-120104, "NAS changes for cause code 17", Xiamen (P.R. China), 6-10. Feb. 2012, Change Request 24.301 CR 1318.

* cited by examiner

DEDICATED BARRING AND ESCAPE COMMAND

CLAIM OF PRIORITY FROM COPENDING PROVISIONAL PATENT APPLICATION

This patent application claims priority under 35 U.S.C. §119(e) from Provisional Patent Application No. 61/608,356, filed Mar. 8, 2012, the disclosure of which is incorporated by reference herein in its entirety.

TECHNICAL FIELD

The exemplary and non-limiting embodiments of this invention relate generally to wireless communication systems, methods, devices and computer programs and, more specifically, relate to radio resource control (RRC) signaling, user equipment (UE) connection requests and network (NW) responses, and to access class barring.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

A situation can occur where a core network is overloaded or a radio access network node. e.g., a base station or a NodeB or an evolved NodeB (eNB) or some core network element such as MME in the LTE system, is overloaded or nearly overloaded. In this case the network can use RRC signaling, such as a RRC Connection Rejection or Connection Release message to prevent a new UE from having RRC connection to the network. When this occurs the UE may follow a normal cell re-selection procedure and typically will remain in the same cell as it stays in the strongest cell. After some period of time the UE will retry to make a connection to the network. However, for as long as the network rejects the RRC Connection Request from the UE the UE will be out of service from the user point of view as it cannot establish any type of data or voice connection to the network. As can be appreciated, an inability of the UE to connect to the network for some indeterminate period of time can be viewed negatively by the user.

SUMMARY

The examples of the embodiments of this invention provide in a first non-limiting aspect thereof a method that comprises receiving a connection request in uplink signaling from a user equipment, the user equipment being located in a cell; making a determination whether the user equipment can be connected and, if it is determined that the user equipment cannot be connected, informing the user equipment by downlink signaling, as a response to the connection request, that the user equipment cannot be connected, where the downlink signaling comprises information that indicates that the user equipment should de-prioritize a current carrier frequency or current radio access technology.

The examples of the embodiments of this invention provide in another non-limiting aspect thereof a non-transitory computer-readable medium that contains software program instructions. Execution of the software program instructions by at least one data processor results in performance of operations that comprise receiving a connection request in uplink signaling from a user equipment, the user equipment being located in a cell; making a determination whether the user equipment can be connected; if it is determined that the user equipment cannot be connected informing the user equipment by downlink signaling, as a response to the connection request, that the user equipment cannot be connected at the current time, where the downlink signaling comprises information that indicates that the user equipment should de-prioritize a current carrier frequency or current radio access technology.

The examples of the embodiments of this invention provide in another non-limiting aspect thereof an apparatus that comprises at least one data processor and at least one memory that includes computer program code. The at least one memory and computer program code are configured, with the at least one data processor, to cause the apparatus at least to receive a connection request in uplink signaling from a user equipment, the user equipment being located in a cell; make a determination whether the user equipment can be connected; if it is determined that the user equipment cannot be connected, inform the user equipment by downlink signaling, as a response to the connection request, that the user equipment cannot be connected, where the downlink signaling comprises information that indicates that the user equipment should de-prioritize a current carrier frequency or current radio access technology.

The examples of the embodiments of this invention provide in yet another non-limiting aspect thereof a method that comprises sending from a user equipment a connection request in uplink signaling to a network access node, the user equipment being located in a cell; and receiving by downlink signaling, as a response to the connection request, an indication that the user equipment cannot be connected at the current time, where the downlink signaling comprises information that indicates that the user equipment should de-prioritize a current carrier frequency or current radio access technology.

The examples of the embodiments of this invention provide in still another non-limiting aspect thereof an apparatus that comprises at least one data processor and at least one memory that includes computer program code. The at least one memory and computer program code are configured, with the at least one data processor, to cause the apparatus at least to send a connection request in uplink signaling to a network access node; and to receive by downlink signaling, as a response to the connection request, an indication that the apparatus cannot be connected at the current time, where the downlink signaling comprises information that indicates that apparatus should de-prioritize a current carrier frequency or current radio access technology.

DETAILED DESCRIPTION

One communication system that can benefit from the use of this invention is known as evolved UTRAN (E-UTRAN, also referred to as UTRAN-LTE or as E-UTRA). In this system the DL access technique is OFDMA, and the UL access technique is SC-FDMA.

One specification of interest is 3GPP TS 36.300 V11.0.0 (2011-12) *Technical Specification* 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), referred to for simplicity hereafter as 3GPP TS 36.300.

Figure 1A:
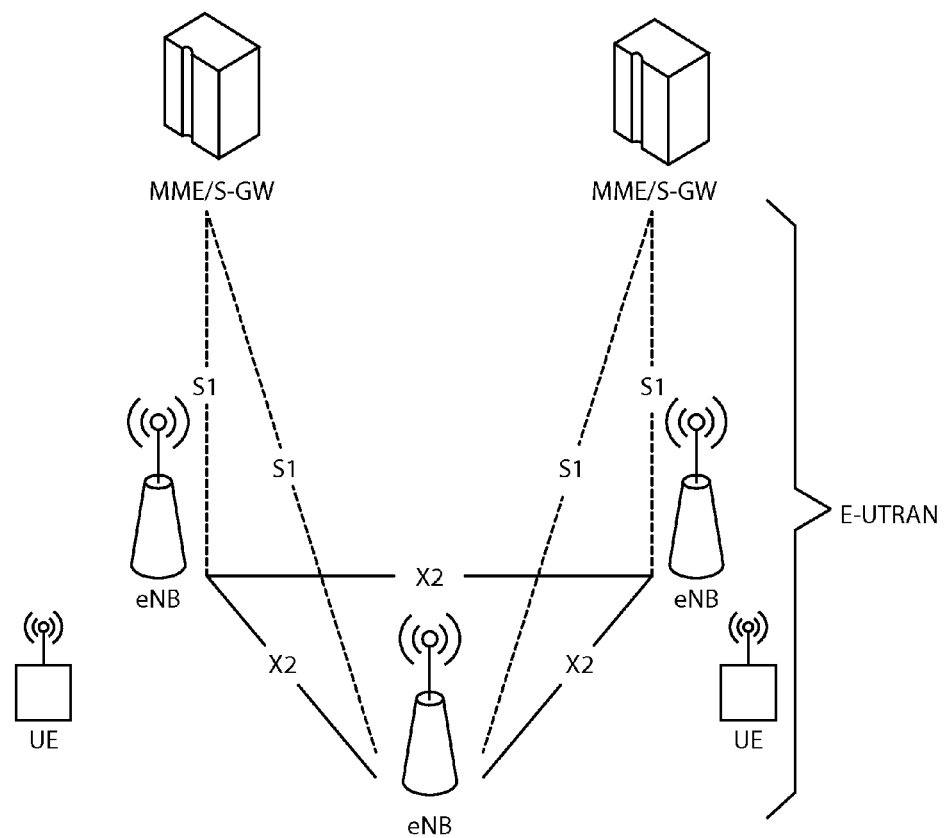
FIG. 1A reproduces FIG. 4.1 of 3GPP TS 36.300, and shows the overall architecture of the E-UTRAN system.
Figure 4:
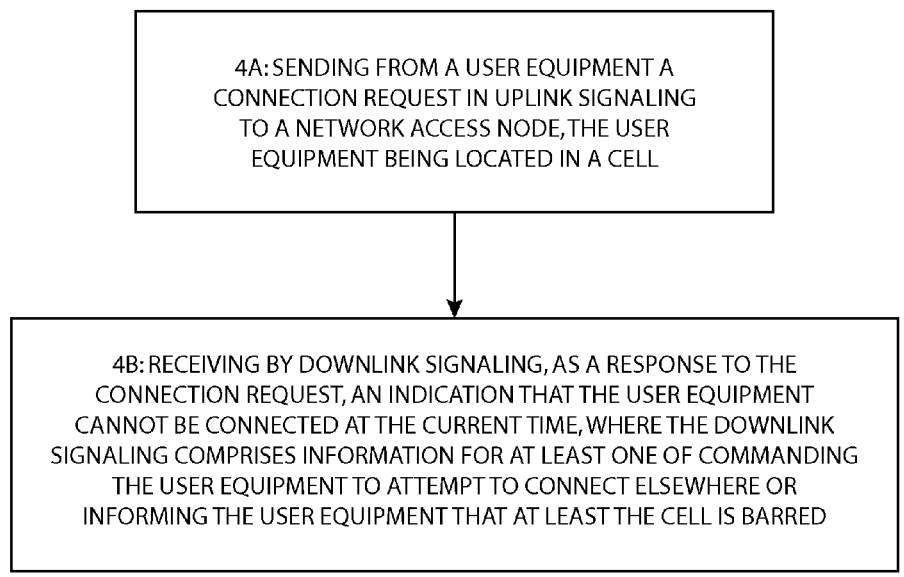
FIG. 4 is another logic flow diagram that illustrates the operation of a further method, and a result of execution of computer program instructions embodied on a computer readable medium, in accordance with the exemplary embodiments of this invention.

FIG. 1A is based on FIG. 4.1 of 3GPP TS 36.300 and shows the overall architecture of the E-UTRAN system. The E-UTRAN system includes eNBs, providing the E-UTRAN user plane and control plane (RRC) protocol terminations towards the UEs. The eNBs are interconnected with each other by means of an X2 interface. The eNBs are also connected by means of an S1 interface to an EPC, more specifically to a MME by means of a S1 MME interface and to a S-GW by means of a S1 interface (MME/S-GW). The S1 interface supports a many-to-many relationship between MMEs, S-GWs and eNBs.

Also of interest herein are further releases of 3GPP LTE targeted towards future systems, referred to herein for convenience simply as LTE-Advanced (LTE-A). A goal of LTE-A is to provide significantly enhanced services by means of higher data rates and lower latency with reduced cost, while maintaining backwards compatibility with earlier releases of LTE (e.g., with Rel-8).

Also of interest herein is 3GPP TS 36.331 V10.4.0 (2011-12) *Technical Specification* 3rd Generation Partnership Project; Technical Specification Group Radio Access Network; Evolved Universal Terrestrial Radio Access (E-UTRA); Radio Resource Control (RRC); Protocol specification (Release 10), such as Section 5, Procedures, and more specifically Sections 5.3, Connection Control; 5.3.3, RRC connection establishment; 5.3.5, RRC connection reconfiguration, 5.3.7, RRC connection re-establishment, 5.3.8, RRC connection release and 5.4, Inter-RAT mobility. Pages 23-73 (Section 5.1 through Section 5.4) of 3GPP TS 36.331 are attached hereto as Exhibit D and incorporated by reference herein.

Figure 1B:
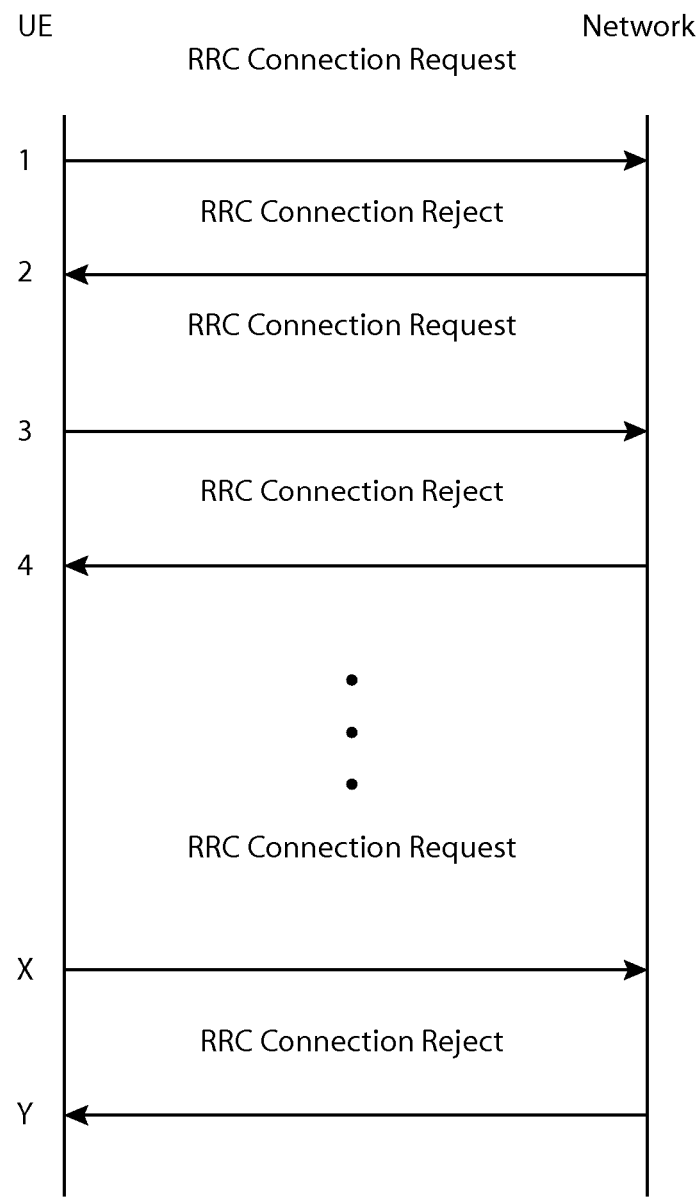
FIG. 1B presents an example of current network/UE behavior according to current specifications.

FIG. 1B presents an example of current network/UE behavior according to the current RRC specifications.

Assume that the UE attempts to attach to an E-UTRA network. At (1) the UE sends an RRC Connection Request. At (2) the network returns an RRC Connection Reject that includes just a wait timer value (up to 16 seconds in accordance with current specifications). The UE applies normal cell reselection procedures, i.e., in the normal case it remains in the same serving cell unless the UE physically moves away from that cell as the current cell has already been selected based on the cell reselection criteria. When the wait timer (T302) expires, the UE again attempts at (3) to initiate the RRC Connection Request to the network. At (4) the network returns another RRC Connection Reject including a wait timer value. At X and Y the UE can remain in a loop of sending RRC Connection Request messages and receiving RRC Connection Reject messages until it successfully establishes a RRC connection. As a result of this operation the UE can be without service from the LTE network for some indeterminate amount of time and, furthermore, it is unable to move to another public land mobile network (PLMN) or to another radio access technology (RAT).

Several documents that relate to the problem depicted in FIG. 1B include:

3GPP TSG CT WG1 Meeting #76, C1-120546, Xiamen (P.R. China), 6-10 Feb. 2012 Title: LS on RR failures and network reselection, Release: Rel-11, Work Item: SAES2, which is attached hereto as Exhibit A and incorporated herein by reference;

3GPP TSG CT WG1 Meeting #76, C1-120103, Xiamen (P.R. China), 6-10 Feb. 2012, Change Request 24.301 CR 1317, Title: Allow UE to find new RAT on Network errors, Release: Rel-11, which is attached hereto as Exhibit B and incorporated herein by reference; and 3GPP TSG CT WG1 Meeting #76, C1-120104, Xiamen (P.R. China), 6-10 Feb. 2012, Change Request 24.301 CR 1318, Title: NAS changes for cause code 17, Release: Rel-11, which is attached hereto as Exhibit C and incorporated herein by reference.

There can be problems with some or all of the proposals made thus far to address the problem shown in FIG. 1B. Basically the problem exists with the current 3GPP specifications, as the RRC Connection Release with re-direction cannot be used in this scenario. This is due to the fact that, at the point in time that eNB rejects the RRC Connection Request (e.g., at (2) in FIG. 1B), the eNB does not know at least the UE radio capabilities. Thus the eNB does not know where to redirect the UE. In order to obtain the UE capabilities eNB first has to accept the RRC Connection Request and to set up the S1 connection toward the MME so that the eNB can obtain the UE capabilities either from the MME during a UE context setup procedure or from UE itself. As should be appreciated, this procedure of obtaining the UE capabilities adds to the signaling load that is already present in the potentially overloaded cell.

It has been considered to decouple an access class barring (ACB) case from the RRC Connection Reject. In the RRC Connection Reject case the UE would be allowed to increase an attach attempt/tracking area update (TAU) attempt counter, which would limit to five the maximum number of RRC Connection attempts shown in FIG. 1B. Once the number of failed attempts has reached five the UE would be enabled to transition to a state that permits selection of a different PLMN/RAT.

However, there can be several disadvantages associated with this procedure. For example, the UE would attempt to establish the RRC Connection five times before the UE could select a different PLMN/RAT. The timer value for T3411 (a TAU associated timer) is currently fixed in the specifications at 10 seconds, meaning that the UE would be out of service for at least 50 seconds until the TAU counter reached the maximum value (5 attempts times 10 seconds wait time per attempt). Note that the UE out of service time could be even longer, as the maximum wait time for the RRC Connection Reject is 16 seconds and in this case UE has to wait 5 times 16 seconds instead of 5 times 10 seconds. Further, the signaling of the RRC Connection Request/RRC Connection Reject five times in a row would cause unnecessary signaling overhead in the network. Also, the UE could return to the LTE network from another RAT/PLMN according to re-selection rules, and the problem can then re-occur if the LTE core network and/or RAN node is still overloaded. As can be appreciated, the user experience could be severely degraded when service disruptions of a minute or more occur.

Figure 2:
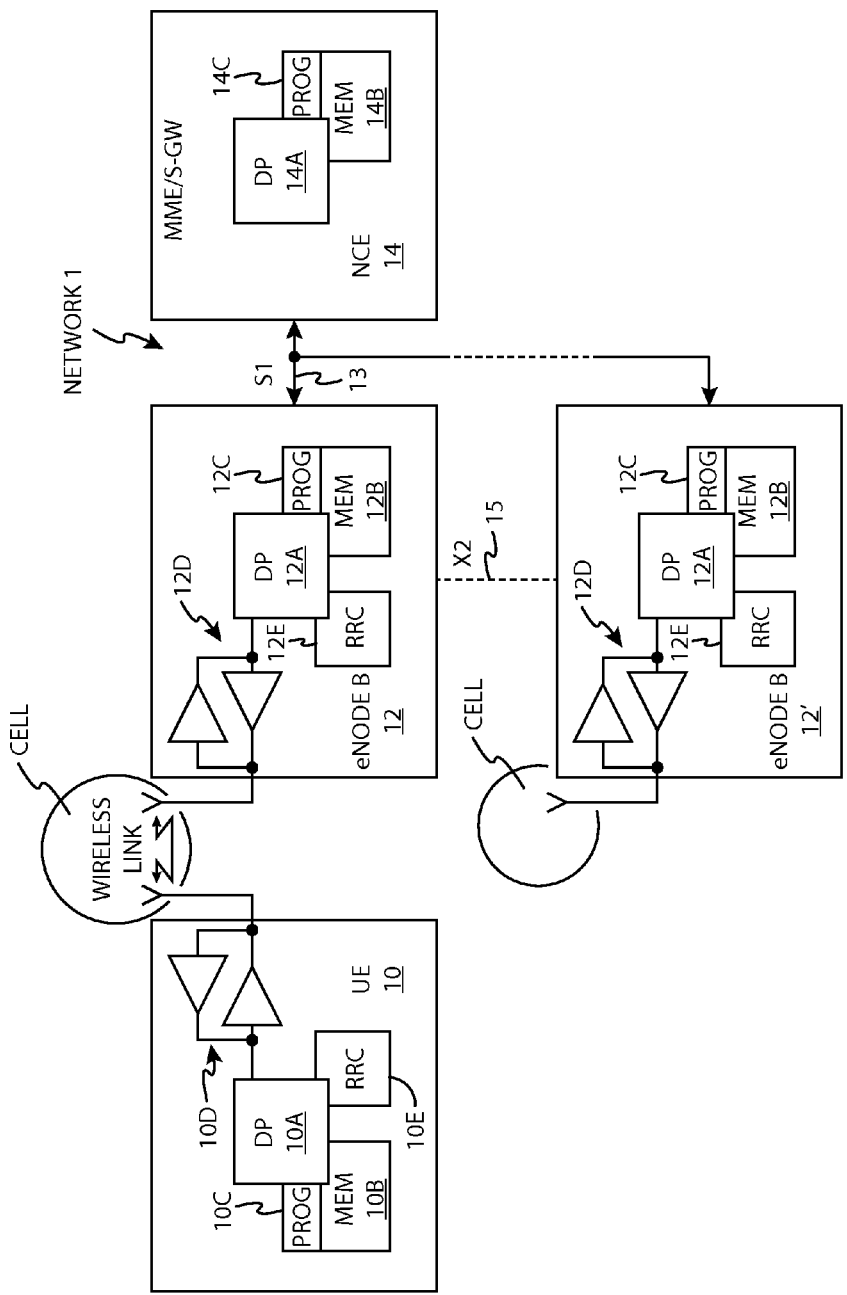
FIG. 2 shows a simplified block diagram of various electronic devices that are suitable for use in practicing the exemplary embodiments of this invention.

Before describing in detail the exemplary embodiments of this invention, reference is made to FIG. 2 for illustrating a simplified block diagram of various electronic devices and apparatus that are suitable for use in practicing the exemplary embodiments of this invention. In FIG. 2 a wireless network 1 is adapted for communication over a wireless link 11 with an apparatus, such as a mobile communication device which may be referred to as a UE 10, via a network access node, such as a Node B (base station), and more specifically an eNB 12. The network 1 may include a network control element (NCE) 14 that may include the MME/SGW functionality shown in FIG. 1A, and which provides connectivity with a further network, such as a telephone network and/or a data communications network (e.g., the internet). The UE 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) transmitter and receiver pair (transceiver) 10D for bidirectional wireless communications with the eNB 12 via one or more antennas. The eNB 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver 12D for communication with the UE 10 via one or more antennas (typically several when multiple input/multiple output (MIMO) operation is in use). The eNB 12 establishes at least one cell within which the UE 10 can be operated. The eNB 12 is coupled via a data/control path 13 to the NCE 14. The path 13 may be implemented as the S1 interface shown in FIG. 1A. The eNB 12 may also be coupled to another eNB via data/control path 15, which may be implemented as the X2 interface shown in FIG. 1A.

Also shown in FIG. 2 is a second network access node, such as a second eNB 12' that establishes at least one second cell. The second eNB 12' can be part of the same PLMN and operate with the same RAT as the first eNB 12, or it can be part of a different PLMN and/or it may operate with a different RAT than the first eNB 12. The second radio access node 12' may or may not be connected with the MME/S-GW 14 via the S1 interface 13, and may or may not be connected to the first eNB 12 via the X2 interface 15. The second network access node (e.g., second eNB 12') is shown so as to represent at least one of another cell/frequency band/carrier/RAT/PLMN that the UE 10 could be re-directed to in accordance with certain examples of the embodiments of this invention, as described in detail below.

For the purposes of describing the exemplary embodiments of this invention the UE 10 may be assumed to also include an RRC protocol layer 10E, and the eNB 12 also includes an RRC protocol layer 12E. At least the RRC protocol layers 10E and 12E are configured to operate in accordance with the embodiments of this invention as described in detail below. If the second radio access node 12' is an eNB then it too can include the modified RRC protocol layer 12E.

At least one of the PROGs 10C and 12C is assumed to include program instructions that, when executed by the associated DP, enable the device to operate in accordance with the exemplary embodiments of this invention, as will be discussed below in greater detail. That is, the exemplary embodiments of this invention, including the RRC protocol layers 1E, 12E, may be implemented at least in part by computer software executable by the DP 10A of the UE 10 and/or by the DP 12A of the eNB 12, or by hardware, or by a combination of software and hardware (and firmware).

The various data processors, memories, programs, transceivers and interfaces depicted in FIG. 2 can all be considered to represent means for performing operations and functions that implement the several non-limiting aspects and embodiments of this invention.

In general, the various embodiments of the UE 10 may include, but are not limited to, cellular mobile devices, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable memories 10B and 12B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 10A and 12A may be of any type suitable to the local technical environment, and may include one or more of general purpose computers, special purpose computers, microprocessors, digital signal processors (DSPs) and processors based on multi-core processor architectures, as non-limiting examples.

In accordance with the examples of the embodiments of this invention the UE 10 may be commanded away from a problematic cell/band/carrier/RAT/PLMN with explicit signaling (e.g., an RRC Connection Reject and/or RRC Connection Release message) and optionally with information on how long this command is valid. Note that the length of this command valid duration can be signaled with the command or it can be a fixed value. In another embodiment the eNB 12 can bar the cell/band/carrier/RAT/PLMN with dedicated signaling and optionally with the information on how long this barring is valid. The length of this duration can be signaled with the barring indication or can be a fixed value.

It is pointed out that the embodiments of this invention are applicable to non-LTE-A systems and to LTE-A systems and, thus, may be considered to be relevant and pertinent to E-UTRAN system(s) in general. However, it should also be kept in mind that the embodiments of this invention may be applied to other (non-E-UTRAN) communication systems as well.

The following signaling options (which may be included in, for example, an RRC message) can be considered for commanding the UE 10 to move elsewhere or to de-prioritize the current frequency and/or current RAT and/or to bar the current cell/band/carrier/RAT/PLMN.

1. An indication can be sent to the UE 10 that the UE 10 should move elsewhere or de-prioritize (i.e., the UE may consider the frequency, where this indication is received, as the lowest priority) the current frequency and/or current RAT. In this case the UE 10 could (re)select a cell on other cell/band/carrier/RAT/PLMN. A barring time could be signaled to the UE 10 or it could be statically specified and, during this time, the UE 10 does not consider the frequency and/or RAT where it receives the timer for re-selection unless there is no other coverage available (e.g., anyCell state).

2. An indication can be sent to the UE 10 that the current cell/band/carrier/RAT/PLMN is barred. In this case the barring time could be signaled or statically specified and during this time the UE 10 does not consider the frequency and/or RAT where it receives the timer for re-selection unless there is no other coverage available (e.g., anyCell state).

3. An explicit cell/PLMN level information can be sent to the UE 10 to indicate where the UE should (re)select. The barring time could be signaled or statically specified and during this time UE 10 does not consider the frequency and/or RAT where it receive the timer for re-selection unless there is no other coverage available (e.g., anyCell state). In addition, band/carrier/RAT information could be considered, although it should be noted that in the RRC connection setup phase the network does not have the radio access capabilities of the UE 10 and thus the network does not have explicit knowledge of which frequency bands and RATs are supported by the UE 10.

In some RRC message(s), e.g., RRC Connection Reject and/or RRC Connection Release, the network can indicate some or all of the following:

1. that the UE 10 should move elsewhere or de-prioritize the current frequency and/or current RAT;
2. that the current cell is barred; and/or
3. explicit cell/band/carrier/RAT/PLMN level information where the UE 10 should attempt to (re)select (subject to the possible constraint that the network may not yet know at least the radio capabilities of the UE 10), and/or
4. how long the UE 10 should not consider/de-prioritize/bar the current cell/frequency/band/carrier/RAT/PLMN.

In a case where the UE 10 receives any of the information above, the UE 10 behavior may be different depending on whether the UE 10 is or is not delay tolerant. In general, the embodiments of this invention can be used to shorten the coverage break for 'normal' UEs, but not necessarily for delay-tolerant UEs (e.g., those UEs not involved in a real-time, low latency type connection such as a VoIP or VoLTE type of connection). For example, if delay-tolerant UEs were all to be re-directed to some other RAT this could potentially cause an overload condition in that RAT. Thus, there are at least two possibilities that can be considered in accordance with the embodiments of this invention:

(a) the eNB 12 should not give the above parameters to the UE 10 if the RRC establishment cause for a particular UE is set to "delay tolerant"; or
(b) if the parameters are given, the UE 10 ignores the parameters (e.g., direction to another RAT) if the RRC Connection Request is subject to a delay tolerant access request.

The use of at least some of the embodiments of this invention can be applied as well to extended access barring (EAB) configured UEs as well. In order to not create an overload condition in another RAT, and if the UE 10 is configured for EAB, the UE 10 can ignore the parameters and behave as a legacy UE thus remaining in the same cell unless the cell-reselection condition has been changed.

Based on the foregoing it should be apparent that the exemplary embodiments of this invention provide a method, apparatus and computer program(s) to overcome the problems that were discussed above, and to provide an enhanced user experience. Further, the network is able to bar a cell with dedicated signaling is enabled to command the UE 10 away from a problematic cell with dedicated signaling, even in a case where the network is not aware of the UE's radio access capabilities.

Figure 3:
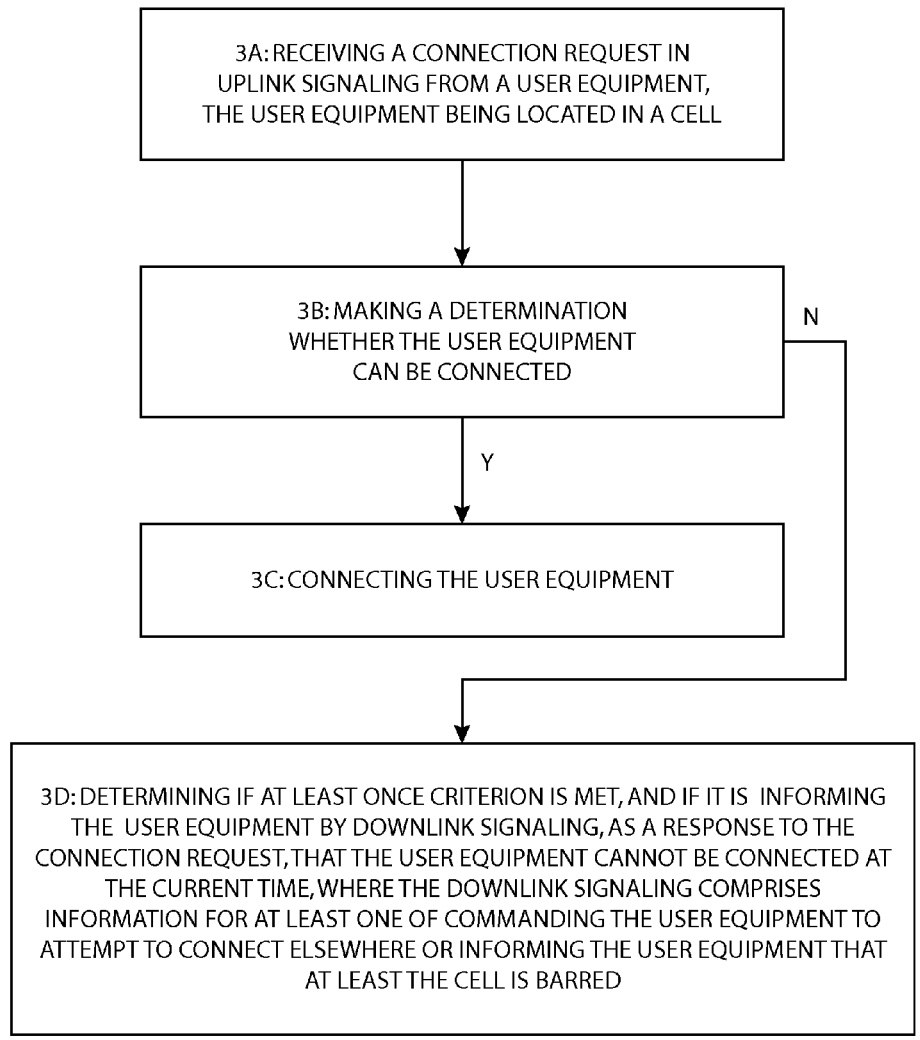
FIG. 3 is a logic flow diagram that illustrates the operation of a method, and a result of execution of computer program instructions embodied on a computer readable medium, in accordance with the exemplary embodiments of this invention.

FIG. 3 is a logic flow diagram that illustrates the operation of a method, and a result of execution of computer program instructions, in accordance with the exemplary embodiments of this invention. In accordance with these exemplary embodiments a method performs, at Block 3A, a step of receiving a connection request in uplink signaling from a user equipment, the user equipment being located in a cell. At Block 3B there is a step of making a determination whether the user equipment can be connected. If the user equipment can be connected, then at Block 3C there is a step of connecting the user equipment, otherwise at Block 3D there is a step determining if at least one criterion is met, and if it is informing the user equipment by downlink signaling, as a response to the connection request, that the user equipment cannot be connected at the current time, where the downlink signaling comprises information for at least one of commanding the user equipment to attempt to connect elsewhere or informing the user equipment that at least the cell is barred.

In the method of FIG. 3, where the uplink signaling is a radio resource control connection request message, and the downlink signaling is a radio resource control connection rejection message.

In the method of FIG. 3, where the uplink signaling is a radio resource control connection request message, and the downlink signaling is a radio resource control connection release message.

It should be noted that between RRC request and release messages there may be other messages exchanged between the UE 10 and the network (eNB 12) as well.

In the method of FIG. 3, where the downlink signaling comprises information to inform the user equipment that the user equipment should move elsewhere or de-prioritize a current frequency and/or current radio access technology, and where the user equipment is enabled to select or re-select another cell in the same or a different frequency band, the same or a different radio frequency carrier, the same or a different radio access technology, or the same or a different public land mobile network.

In the method as in the preceding paragraph, where the downlink signaling further comprises an indication that the user equipment is not to consider the frequency and/or radio access technology from which it receives the downlink signaling for some specified period of time, unless there is no other coverage available.

In the method of FIG. 3, where the downlink signaling comprises information to inform the user equipment that at least one of the current cell, or frequency band, or radio frequency carrier, or radio access technology, or public land mobile network is barred.

In the method as in the preceding paragraph, where the downlink signaling further comprises an indication that the user equipment is not to consider the at least one of the current cell, or frequency band, or radio frequency carrier, or radio access technology, or public land mobile network for some specified period of time, unless there is no other coverage available.

In the method of FIG. 3, where the downlink signaling comprises information to inform the user equipment of at least one of explicit cell or public land mobile network information to indicate where the user equipment should attempt to connect.

In the method as in the preceding paragraph, where the downlink signaling further comprises an indication that the user equipment is not to consider the at least one of the frequency or radio access technology from which it receives a redirection timer value, unless there is no other coverage available. Note that this redirection timer could also, in some embodiments, be considered as a barring timer.

In the method of FIG. 3, where the at least one criterion is that the user equipment is not a delay tolerant user equipment.

FIG. 4 is a logic flow diagram that illustrates the operation of a method, and a result of execution of computer program instructions, further in accordance with the exemplary embodiments of this invention. In accordance with these exemplary embodiments a method performs, at Block 4A, a step of sending from a user equipment a connection request in uplink signaling to a network access node, the user equipment being located in a cell. At Block 4B there is a step of receiving by downlink signaling, as a response to the connection request, an indication that the user equipment cannot be connected at the current time, where the downlink signaling comprises information for at least one of commanding the user equipment to attempt to connect elsewhere or informing the user equipment that at least the cell is barred.

In the method of FIG. 4, where the uplink signaling is a radio resource control connection request message, and the downlink signaling is a radio resource control connection rejection message.

It should again be noted that between RRC request and release messages there may be other messages exchanged between the UE 10 and the network (eNB 12) as well.

In the method of FIG. 4, where the uplink signaling is a radio resource control connection request message, and the downlink signaling is a radio resource control connection release message.

In the method of FIG. 4, where the downlink signaling comprises information to inform the user equipment that the user equipment should move elsewhere or de-prioritize a current frequency and/or current radio access technology, and in response the user equipment selects or re-selects another cell in the same or a different frequency band, the same or a different radio frequency carrier, the same or a different radio access technology, or the same or a different public land mobile network.

In the method as in the preceding paragraph, where the downlink signaling further comprises an indication that the user equipment is not to consider the frequency and/or radio access technology from which it receives the downlink signaling for some specified period of time, unless there is no other coverage available.

In the method of FIG. 4, where the downlink signaling comprises information to inform the user equipment that at least one of the current cell, or frequency band, or radio frequency carrier, or radio access technology, or public land mobile network is barred.

In the method as in the preceding paragraph, where the downlink signaling further comprises an indication that the user equipment is not to consider the at least one of the current cell, or frequency band, or radio frequency carrier, or radio access technology, or public land mobile network for some specified period of time, unless there is no other coverage available.

In the method of FIG. 4, where the downlink signaling comprises information to inform the user equipment of at least one of explicit cell or public land mobile network information to indicate where the user equipment should attempt to connect.

In the method as in the preceding paragraph, where the downlink signaling further comprises an indication that the user equipment is not to consider the at least one of the frequency or radio access technology from which it receives a redirection timer value, unless there is no other coverage available.

Note again that this redirection timer could also, in some embodiments, be considered as a barring timer.

In the method of FIG. 4, where the user equipment determines if it is in a delay tolerant operational mode and/or is EAB configured and, if it is, the user equipment ignores at least the information that at least one of commands the user equipment to attempt to connect elsewhere or that informs the user equipment that at least the cell is barred.

The exemplary embodiments also pertain to a non-transitory computer-readable medium that contains software program instructions, where execution of the software program instructions by at least one data processor results in performance of operations that comprise execution of the method of shown in FIG. 3 or in FIG. 4, and the various paragraphs above that are descriptive of FIGS. 3 and 4.

The various blocks shown in FIGS. 3 and 4 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, the embodiments also pertain at least in part to an apparatus that comprises at least one data processor and at least one memory that includes computer program code. The at least one memory and computer program code are configured, with the at least one data processor, to cause the apparatus at least to receive a connection request in uplink signaling from a user equipment, where the user equipment is located in a cell, to make determination whether the user equipment can be connected and, if not, to determine if at least one criterion is met, and if it is, to inform the user equipment by downlink signaling, as a response to the connection request, that the user equipment cannot be connected at the current time. The downlink signaling is configured to comprise information for at least one of commanding the user equipment to attempt to connect elsewhere or informing the user equipment that at least the cell is barred.

The embodiments of this invention also pertain at least in part to a further apparatus that comprises at least one data processor and at least one memory that includes computer program code. The at least one memory and computer program code are configured, with the at least one data processor, to cause the apparatus at least to send from a user equipment a connection request in uplink signaling to a network access node, where the user equipment is located in a cell. The apparatus is further configured to receive by downlink signaling, as a response to the connection request, an indication that the user equipment cannot be connected at the current time, where the downlink signaling comprises information for at least one of commanding the user equipment to attempt to connect elsewhere or informing the user equipment that at least the cell is barred.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters, timers and the like are not intended to be limiting in any respect, as these parameters and timers, etc., may be identified by any suitable names. Further, the various names assigned to different protocol layers (e.g., RRC, etc.) are not intended to be limiting in any respect, as these various protocol layers may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   receiving a connection request in uplink signaling from a user equipment, the user equipment being located in a cell;
   making a determination, as a response to the connection request, whether the user equipment can be connected;
   when the determination indicates that the user equipment cannot be connected, informing the user equipment by downlink signaling that the user equipment cannot be connected, wherein the downlink signaling comprises information that indicates that the user equipment should de-prioritize a current carrier frequency or current radio access technology, wherein the information further comprises a timer value to indicate a period of time for which the current carrier frequency or the current radio access technology is to be de-prioritized.

2. The method of claim 1, wherein the downlink signaling comprises radio resource control signaling.

3. The method of claim 1, wherein the downlink signaling comprises a radio resource control connection reject message.

4. The method of claim 1, wherein the uplink signaling comprises a radio resource control connection request message, and wherein the downlink signaling comprises a radio resource control connection reject message.

5. An apparatus comprising:
   at least one processor; and
   at least one memory including computer program code, the at least one memory and the computer program code configured to, with the at least one processor, cause the apparatus to perform at least the following:
   receive a connection request in uplink signaling from a user equipment, the user equipment being located in a cell;
   make a determination, as a response to the connection request, whether the user equipment can be connected;
   when the determination indicates that the user equipment cannot be connected, inform the user equipment by downlink signaling that the user equipment cannot be connected, wherein the downlink signaling comprises information that indicates that the user equipment should de-prioritize a current carrier frequency or current radio access technology, wherein the information further comprises a timer value to indicate a period of time for which the current carrier frequency or the current radio access technology is to be de-prioritized.

6. The apparatus of claim 5, wherein the downlink signaling comprises a radio resource control connection reject message.

7. The apparatus of claim 5, wherein the uplink signaling comprises a radio resource control connection request message, and wherein the downlink signaling comprises a radio resource control connection reject message.

8. The apparatus of claim 5, wherein the downlink signaling is sent when the user equipment is not a delay tolerant user equipment.

9. A method comprising:
   sending from a user equipment a connection request in uplink signaling to a network access node, the user equipment being located in a cell; and
   receiving by downlink signaling, as a response to the connection request, an indication that the user equipment cannot be connected at the current time, wherein the downlink signaling comprises information that indicates that the user equipment should de-prioritize a current carrier frequency or current radio access technology, wherein the information further comprises a timer value to indicate a period of time for which the current carrier frequency or current radio access technology is to be de-prioritized.

10. The method of claim 9, wherein the downlink signaling comprises radio resource control signaling.

11. The method of claim 9, wherein the downlink signaling comprises a radio resource control connection reject message.

12. The method of claim 9, wherein the uplink signaling comprises a radio resource control connection request message, and wherein the downlink signaling comprises a radio resource control connection reject message.

13. An apparatus comprising:
   at least one processor; and
   at least one memory including computer program code, the at least one memory and the computer program code configured to, with the at least one processor, cause the apparatus to perform at least the following:

send a connection request in uplink signaling to a network access node; and receive by downlink signaling, as a response to the connection request, an indication that the apparatus cannot be connected at the current time, wherein the downlink signaling comprises information that indicates that apparatus should de-prioritize a current carrier frequency or current radio access technology, wherein the information further comprises a timer value to indicate a period of time for which the current carrier frequency or the current radio access technology is to be de-prioritized.

14. The apparatus of claim 13, wherein the downlink signaling comprises radio resource control signaling.

15. The apparatus of claim 13, wherein the downlink signaling comprises a radio resource control connection reject message.

16. The apparatus of claim 13, wherein the uplink signaling comprises a radio resource control connection request message, and wherein the downlink signaling comprises a radio resource control connection reject message.

* * * * *